June 18, 1963
J. K. MERTZWEILER ETAL  3,094,564
REMOVAL OF METAL RESIDUES FROM CARBONYLATION PRODUCTS
Filed Jan. 25, 1960
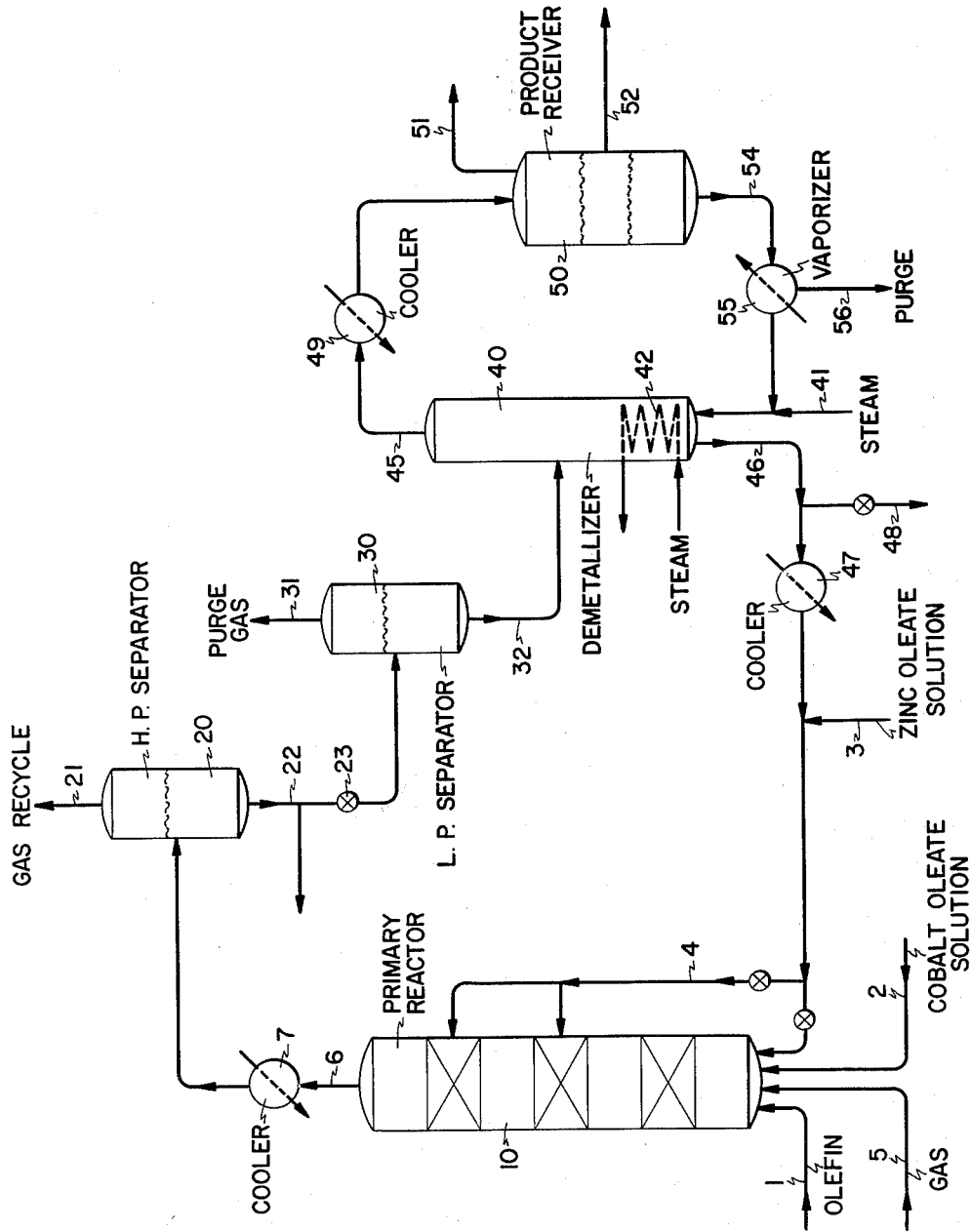
Joseph Kern Mertzweiler
Leroy Virgil Robbins, Jr.    Inventors
Peter Joseph Berkeley, Jr.
By Peter H. Smolka Patent Attorney

3,094,564
REMOVAL OF METAL RESIDUES FROM CARBONYLATION PRODUCTS

Joseph Kern Mertzweiller and Leroy Virgil Robbins, Jr., Baton Rouge, La., and Peter Joseph Berkeley, Jr., Tulsa, Okla., assignors to Esso Research and Engineering Company, a corporation of Delaware
Filed Jan. 25, 1960, Ser. No. 4,296
4 Claims. (Cl. 260—604)

This invention relates to an improvement in demetallizing aldehydes and alcohols prepared by a process involving in combination carbonylation of an olefin and aldolization of the resulting aldehyde. More particularly it relates to an improvement in removing catalyst residues, such as cobalt and zinc compounds, from the aforementioned aldolized product by steam distillation. Still more particularly the invention relates to the recovery of the catalyst in an oil soluble form such that it can be recycled to the synthesis steps of the process.

An increasingly important commercial process involves the conversion of lower olefins into aldehydes and alcohols having more than twice as many carbon atoms as the original feed. Essentially this modification of the well-established oxo process involves reaction of the olefin with carbon monoxide and hydrogen in the presence of a cobalt carbonylation catalyst at elevated temperature and pressure whereby the olefin is carbonylated to give an aldehyde and an alcohol having one more carbon atom than the original olefin. The aldehyde resulting from this oxo synthesis is then dimerized and dehydrated by an aldol reaction in the presence of a dimerization-dehydration catalyst such as a compound of zinc, beryllium, magnesium or barium. In this manner aldehydes having twice as many carbon atoms as the intermediate aldehyde are obtained.

The dehydro-aldolization step can be carried out directly in the carbonylation stage by including a catalyst such as zinc as well as cobalt in the oxo synthesis mixture. Alternatively, the dimerization may be carried out by subjecting the crude aldehyde effluent from a conventional oxo stage to aldolization and dehydration in the presence of zinc or the like in a separate stage. For convenience, both of these alternative oxo-aldol combination processes will be referred to herein generically as the "aldox process" or the "aldox synthesis." In either case, the resulting dimeric aldox aldehyde can be hydrogenated to give the corresponding alcohol. Thus, for instance, propylene can be converted to 2-ethylhexenal and 2-ethylhexanal and eventually to 2-ethylhexanol, butyraldehyde being the intermediate oxo aldehyde which is aldolized. Since the crude aldox aldehyde product in either case contains objectionable cobalt and zinc or other catalytic metal residues, these must be thoroughly removed to make the crude aldox aldehyde suitable for hydrogenation and to assure that the final alcohol product will meet stringent commercial specifications.

In the conventional oxo process wherein an olefin is reacted with hydrogen and carbon monoxide in the presence of a cobalt catalyst only, the crude product is normally demetallized by treatment in the presence of hot water. This causes the oil soluble cobalt carbonyl compounds to decompose, usually in the form of a precipitate. See U.S. Patents 2,679,534 and 2,779,794. In the conventional oxo synthesis it has also been known to decobalt crude, water-containing aldehyde product by steam distillation and to recycle the resulting catalyst-containing aqueous distillation bottoms to the synthesis. See U.S. Patent 2,564,130. Each of these prior processes has been characterized by the presence of a liquid water phase in the decobalting vessel since the water has been found to aid in the decomposition of the oil soluble cobalt carbonyl compounds. However, when such prior techniques were applied to demetallizing an aldox product, i.e. a crude aldehyde containing both cobalt and zinc residues, sufficiently complete demetallizing has not been obtained, apparently because the cobalt and zinc components form a thermally stable complex. Moreover, when the cobalt or zinc catalysts or both are added to the synthesis in the form of water soluble compounds, e.g. as acetate or sulfate salts, a very viscous aqueous solution gradually builds up and reduces the effectiveness of the synthesis stage. The exact nature of this viscous material is not completely understood but is believed to be a supersaturated solution of the zinc salt or other aldolization catalyst component since the metals such as zinc do not form oil soluble carbonyls and are therefore not solubilized in the organic synthesis product in the sense that cobalt is solubilized. If this situation is allowed to proceed long enough, the reactor becomes completely filled with the viscous product and reaction is lost. This is particularly aggravated when catalyst is recycled from the product demetallizing stage to the synthesis stage.

It has now been discovered that all such difficulties can be substantially avoided, and unusually effective removal of metal-containing catalyst residues from aldox-type products can be obtained provided that the crude aldox product is treated with steam under conditions such that the desired aldehyde and alcohol components are steam distilled overhead and no liquid water phase is present in the demetallizing vessel and provided further that the cobalt and aldolization catalysts are originally added to the system in the form of oil soluble compounds such as their fatty or naphthenic acid salts. In addition, when operating the steam distillation at or near atmospheric pressure, it has been found desirable to maintain the distillation temperatures between about 200° and 350° F., preferably below 300° F., or at correspondingly higher temperatures when operating at more elevated pressures. When higher distillation temperatures are employed than just indicated, increasing amounts of potential dimer aldehyde product tend to be lost, presumably by reversion of the intermediate dimeric aldol to the monomer aldehyde and eventual hydrogenation of the latter.

By proceeding in accordance with this invention, the catalyst residues are recovered from the demetallizing section of the process in oil soluble form in the high boiling organic distillation bottoms. These preferably include the dimeric aldol, i.e. dimeric hydroxy aldehyde, in addition to heavier constituents such as acetals, esters and other condensation products. The resulting catalyst-containing bottoms can then be advantageously recycled from the demetallizing section to the aldox section of the process, thereby providing a major part of the catalyst requirements of the synthesis stage. In addition, recycling of the bottoms has been found to increase the yield of desired end products.

The invention is particularly applicable to the demetalization of aldehydes having $2n+2$ carbon atoms obtained from olefins corresponding to the formula $C_nH_{2n}$ wherein "$n$" is an integer ranging from 2 to 5. Suitable olefins thus include ethylene, propylene, butene-1, butene-2, isobutylene, as well as any pentene isomers which on oxonation produce an aldehyde having at least one hydrogen atom on the carbon atom adjacent to the aldehyde group, i.e. the olefin must lead to an aldehyde capable of aldolization.

The aforementioned olefin feed is reacted with a synthesis gas mixture containing hydrogen and carbon monoxide in a ratio between about 0.25 to 4 volumes of hydrogen per volume of carbon monoxide, $H_2/CO$ volume ratios between 1/1 and 2/1 being preferred. The optimum conditions for reacting the olefin with the synthesis gas varies somewhat depending on the nature of the olefin feed, but generally the reaction is conducted at pressures of about 1500 to 4500 p.s.i.g., preferably 2500 to 3500 p.s.i.g., and at temperatures in the range of from about 200° to 450° F., preferably 250° to 375° F. About 2500 to 25,000 cubic feet of hydrogen and carbon monoxide (measured at standard temperature and pressure), preferably 4,000 to 6,000 standard cubic feet, per barrel of liquid olefin feed are normally employed.

In the one-step "aldox" process the catalyst for this reaction is a mixture of cobalt and zinc compounds supplied in a water insoluble form, e.g., in the form of metal powder or turnings or in the form of metal salts of $C_6$ to $C_{18}$ and higher fatty acids, such as hexanoic, lauric, stearic, oleic, linoleic, or other suitable organic acids such as naphthenic. In this manner cobalt is generally added to the extent of 0.2 to 0.5% calculated as metal on olefin feed, while zinc is added to the extent of 0.05 to 0.5%, preferably 0.1 to 0.2% calculated as metal on olefin feed. The crude liquid aldehyde product from this synthesis contains a mixture of both monomer and dimer aldehydes and alcohols as well as the catalyst, substantially as described in U.S. Patent 2,811,567 to which reference may be had for further details.

Alternatively, instead of converting the olefin to the dimer aldehyde in one step by the so-called aldox reaction just described, the present invention is similarly applicable to dimer aldehydes obtained by the two-step process wherein the crude aldehyde obtained in a conventional oxo synthesis is aldolized and dehydrated in the presence of zinc or other aldolization-dehydration catalyzing metals or their water-insoluble compounds as hereinbefore described. In such a process the cobalt catalyst used in the oxo step is usually allowed to remain in the oxo aldehyde being passed to the aldolization stage so that the crude aldox aldehyde product normally contains both the oxo catalyst and the aldolization catalyst. The general operation of such a process is described in U.S. Patent 2,820,067 to which reference may be had for further details. The oxo step of the two-step process is carried out under substantially the same conditions as those described hereinbefore with reference to the one-step aldox synthesis except that, due to the absence of zinc in the conventional oxo step, the cobalt concentration in the latter may be reduced to 0.1 percent or even less, based on the olefin feed.

Taking the manufacture of 2-ethylhexanol from propylene as an example, it will be understood that both the one-step process and the two-step process involve the following combination or sequence of reactions:

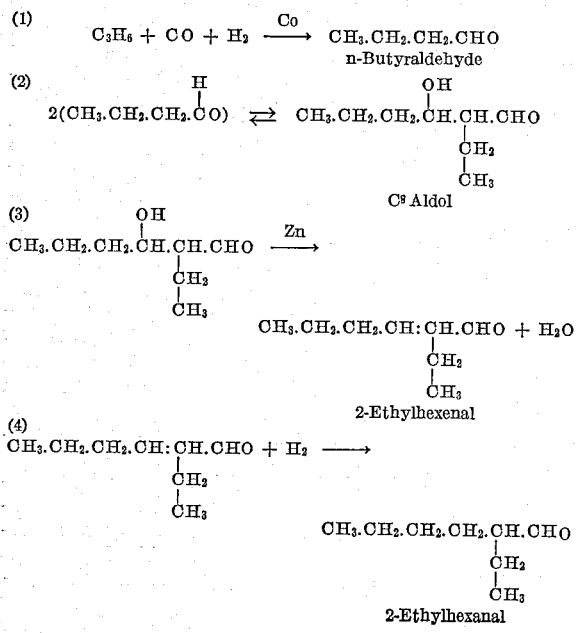

2-Ethylhexanal

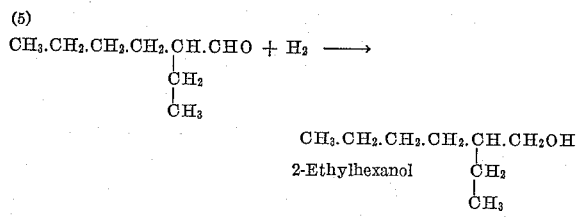

2-Ethylhexanol

Both the one-step process and the two-step process result in a crude aldehyde mixture, hereinafter referred to as the "crude aldox mixture," which contains as principal products the unsaturated and saturated dimer aldehydes corresponding to reactions 3 and 4 described above, as well as varying amounts of the monomer aldehyde from reaction 1, its dimeric aldol from reaction 2, the corresponding alcohols, heavy condensation products and the metal-containing catalyst residues. This crude aldox mixture must then be effectively demetallized before the aldehydes contained therein are hydrogenated to produce high-quality alcohols suitable for the manufacture of plasticizers and the like. It is with this demetallizing step that the present invention is concerned.

The present invention and its application will best be understood from the following more detailed description, wherein reference will be had to the accompanying drawing. This drawing is a schematic representation of a system suitable for carrying out a preferred embodiment of the invention.

Referring now to the drawing, propylene is fed through feed line 1 to the bottom of primary reactor 10. The latter comprises a reaction vessel preferably divided into a plurality of discrete zones separated by trays and a free space. The reactor is desirably packed with inert solids to facilitate gas-liquid contact.

Also passed into reactor 10 are a cobalt carbonylation catalyst, e.g. cobalt oleate, and a dimerization-dehydration catalyst, e.g. zinc oleate. These water-insoluble catalysts may be added as solutions in the olefinic feed or in the oily distillation residue obtained from demetallizer 40 as hereafter described. In a preferred embodiment a solution of cobalt oleate in propylene is added to the bottom of reactor 10 via line 2, while zinc oleate may be added to an intermediate zone of reactor 10 via line 3 after dissolving the zinc soap in the recycled distillation residue passing from demetallizer 40 to reactor 10. It will be understood, however, that at least when the process is first put on stream, a mixture of cobalt and zinc catalysts may be added in the olefin feed to the bottom of the reactor instead of adding each catalyst component separately as hereinbefore indicated. Also, since the present invention permits recycling the required catalysts from the demetallizing stage to the primary reaction stage or stages, once the process has achieved a steady state the respective catalyst components need to be added only in amounts sufficient to compensate for any catalyst lost or purged from the process. Furthermore, while the catalysts may originally be added in the form of oil-soluble soaps or in the metallic form, it is known that the cobalt catalyst in particular will be changed in the process to a cobalt carbonyl compound. In the preferred embodiment the cobalt oleate is fed to reactor 10 in an amount of about 0.2 to 0.5%, e.g. 0.3%, while zinc oleate is added in an amount of about 0.1 to 0.2%, e.g. 0.15% each calculated as metal based on olefin being fed to reactor 10.

Simultaneously a gas mixture containing $H_2$ and CO in approximately equimolar ratio is supplied through line 5 and flows concurrently with the propylene and the resulting aldehyde product upwardly through the reactor. The latter is preferably operated at pressures of 2500 to 3500 p.s.i.g., e.g. 3000 p.s.i.g., and temperatures of about 200° to 400° F., e.g. 350° F.

Liquid oxygenated reaction product or crude aldox mixture comprising aldehydes is withdrawn from an upper portion of the reactor through line 6. The product is then preferably cooled in heat exchanger 7 to a temperature of about 60° to 150° F. and then passed to a high pressure gas-liquid separator 20. Here separation of unreacted gases from liquid product occurs. The unreacted gases may be withdrawn through line 21 and recycled through line 5 to the system or purged as desired. The remaining crude aldox mixture containing in solution essentially all of the initially added cobalt and zinc catalyst is withdrawn from high pressure separator 20 through line 22, expanded through pressure release valve 23 and introduced into low pressure separator 30. The released gas may be purged via line 31, all in accordance with well-known prior practice.

After this step the liquid material is sent via line 32 to demetallizer vessel 40 wherein the essential feature of the invention is performed. The demetallizer of the present invention is a distillation column which may contain from 1 to 10 stages, e.g. three plates. The column is desirably operated at substantially atmospheric pressure through moderately super-atmospheric pressure, e.g. up to 50 p.s.i.a., or moderately sub-atmospheric pressure, e.g. 2 p.s.i.a., are also operable. Steam is introduced into the demetallizer via line 41 at a ratio between about one and four parts of steam per part of crude aldox mixture introduced via line 32. When operating at about atmospheric pressure, the bottom temperature of the vessel is maintained in the range between about 215° and 275° F., preferably at about 260° F. in the case of $C_8$ aldehydes. In any event it is essential to maintain conditions in tower 40 such that no liquid water phase forms therein. In addition, the temperatures in this tower must be above the normal decomposition of cobalt carbonyl and hydrocarbonyl compounds, i.e. above 125° F., but below temperatures that would cause decomposition of the cobalt compounds into solid oil-insoluble precipitates. Also as pointed out earlier herein, the temperature is preferably low enough to prevent much of the dimeric aldol from leaving the demetallizer overhead. Where the heat content of the introduced steam via line 41 is insufficient to assure absence of liquid water in the demetallizing vessel 40, additional heat may be supplied thereto by means of a steam coil 42 or by other appropriate means. Of course, the steam introduced into the vessel directly via line 41 may be superheated to appropriate temperatures such as 350° F., i.e. 125-pounds steam may be used.

An overhead product consisting essentially of $C_8$ aldehydes (B.P. about 345° F.), some 2-ethylhexanol (B.P. 362° F.) plus butyraldehyde and butyl alcohol are withdrawn overhead via line 45. A distillation residue preferably containing the $C_8$ aldol (hydroxy aldehyde; B.P. 384° F.) and all heavier by-products such as acetals and esters as well as the catalyst are withdrawn from the bottom of the demetallizer via line 46, cooled to about 60° to 120° F., e.g. 100° F., in heat exchanger 47 and returned to reactor 10 via line 4. In this manner a high degree of catalyst utilization is effected and an increased product yield obtained. When the zinc aldolization-dehydration step is carried out subsequent to a conventional oxo stage, it is preferable to recycle at least a major part of the aldol-containing distillation residue directly to the aldolization step. However, this requires supplying an appropriately greater makeup amount of fresh cobalt catalyst to the oxo stage and the purging of a corresponding amount of the catalyst recycle, e.g. via line 48. The distillation residue withdrawn via line 46 may amount to about 0.5 to 15%, preferably about 1 to 5%, e.g. 2%, of the crude aldox mixture introduced into the distillation tower via line 32. The optimum amount withdrawn as bottoms depends of course on specific synthesis conditions and consequent composition of the product. Cooling of the distillation residue prior to reintroduction into the exothermic reactor 10 accomplishes the necessary cooling. In addition, by operating tower 40 so that the relatively high boiling $C_8$ hydroxy aldehyde or aldol is withdrawn as part of the bottoms rather than as part of the distillate product, it has been found that an important increase in the yield of the desired final $C_8$ alcohol product can be obtained since otherwise the inclusion of the aldol in the distillate has been found to lead to a partial reversion of the $C_8$ aldol to butyraldehyde in subsequent processing steps. However, demetallizing in accordance with this invention is effective even when the aldol is distilled overhead.

The distillate withdrawn via line 45 is condensed in cooler 49 and passed to product receiver 50. Here the condensate separates to form a water layer which may contain significant amounts of $C_4$ aldehyde and alcohol, an oily crude aldehyde product layer, and gas which may be vented via line 51. The demetallized, catalyst-free crude aldehyde product is withdrawn from receiver 50 via line 52 and, preferably after fractional distillation to separate the monomeric $C_4$ aldehyde from the dimeric $C_8$ aldehydes, the latter are converted to the desired 2-ethylhexanol by hydrogenation in an otherwise well-known manner not illustrated in the drawing. The water layer is withdrawn from receiver 50 via line 54, partially vaporized in vaporizer 55 and the resulting steam and vaporized $C_4$ products returned to demetallizer 40 via line 41 as previously described. A portion of the water may be purged via line 56 to reduce scale formation. Any small amounts of catalytic metals contained in this purge stream may be recovered therefrom if desired, e.g. by contact with a cation exchange resin.

It will be understood that while the invention was described with particular reference to an aldox process wherein an olefin is converted to the corresponding dimer aldehyde in a single vessel containing several distinct stages, the invention is similarly applicable both to aldox processes containing only a single principal reaction stage and to processes wherein the effluent from a conventional cobalt catalyzed oxo stage is converted to the corresponding dimer aldehyde in the presence of added zinc in a separate aldolization-dehydration reactor. Of course, the synthesis conditions will have some effect on the particular composition of the distillation residue withdrawn from the steam distillation tower 40. In any event, however, the invention is characterized by retaining in the steam distillation demetallizer an organic residue boiling higher than the desired dimer alcohol (e.g. 2-ethylhexanol when propylene feed is used. This residue will contain much of the catalyst present in the crude aldox product mixture while the distillate will be substantially free of metal. Since all or nearly all the catalyst is present in the oily residue in dissolved form, recycling of this residue to the reactor provides an unusually effective utilization of the catalyst.

EXAMPLE

In a specific demetallizing operation carried out in accordance with the present invention the following data were obtained:

*Composition of Feed to Demetallizer*

| Crude Aldox Mixture: | Percent |
|---|---|
| i-Butyraldehyde | 17.8 |
| n-Butyraldehyde | 18.5 |
| i-Butanol | 2.3 |
| n-Butanol | 2.2 |
| $C_8$ aldehyde | 28.6 |
| $C_8$ alcohols | 1.8 |
| Bottoms | 25.0 |
| Unknown | 3.8 |
| | 100.0 |

| Metal Content of Crude Aldox Mixture: | Weight Percent |
|---|---|
| Cobalt | 0.1010 |
| Zinc | 0.1870 |

This crude aldox mixture was subjected to steam distillation in a rectification column (2 inches diameter, 2 feet long) packed with Raschig rings. The column was operated at a steam oil ratio of 2.0, at atmospheric pressure and a temperature of 258° F. (average temperature at middle of column).

*Composition of Effluent Streams From Demetallizer*

Bottoms (1.7% on demetallized aldox product):
| | |
|---|---|
| Co, percent | 0.77 |
| Zn, percent | 1.26 |

Aldox Product, Composition:
| | Percent |
|---|---|
| i-Butyraldehyde | 13.8 |
| n-Butyraldehyde | 19.9 |
| i-Butanol | 3.6 |
| n-Butanol | 2.2 |
| $C_8$ aldehyde | 34.4 |
| $C_8$ alcohol | 2.1 |
| Bottoms | 22.9 |
| Unknown | 1.1 |
| | 100.0 |

Metal Content:
| | |
|---|---|
| Co, percent | Nil |
| Zn, percent | 0.0029 |

Water Layer:
| | |
|---|---|
| Oil content, percent | 4.0 |
| Co, percent | 0.0078 |
| Zn, percent | 0.0449 |

Substantially complete demetallization of the product has thus been achieved while about 70% of the catalyst fed to the process has thus been recovered in the bottoms in a form suitable for recycling. The remainder of the catalyst plated out on various vessels and lines. The data further show that the demetallized process of this invention had a very desirable effect on the composition of the product mixture in that the concentration of the $C_8$ aldehyde has been increased.

Unless otherwise indicated, all percentages and proportions of materials are expressed herein on a weight basis.

Since many different ways of practicing the invention will occur to those skilled in the art, it will be understood that the scope of the invention described herein is not to be limited except as set forth in the following claims.

We claim:

1. In a carbonylation process wherein a monoolefin containing $n$ carbon atoms, $n$ being an integer ranging from 2 to 5, is contacted with carbon monoxide and hydrogen in the presence of a water-insoluble, oil-soluble cobalt carbonylation catalyst under conditions to produce an aldehyde containing $n+1$ carbon atoms and the aldehyde is contacted with a water-insoluble, oil-soluble dimerization-dehydration catalyst in a synthesis zone under conditions to produce a crude dimer aldehyde containing $2n+2$ carbon atoms and containing catalyst residues dissolved therein, the improvement which comprises steam distilling in a distillation zone the catalyst-containing crude dimer aldehyde at a temperature between about 212° and 275° F. under conditions such that substantially no liquid water phase is maintained in said steam distillation zone, removing from said distillation zone as a distillate a mixture of steam and substantially catalyst-free oxygenated product having not more than $2n+2$ carbon atoms per molecule, separating an organic phase comprising an aldehyde having $2n+2$ carbon atoms from the said distillate and withdrawing from said distillation zone a catalyst-containing bottoms fraction.

2. A process according to claim 1 wherein the catalyst-containing bottoms fraction withdrawn from the steam distillation zone amounts to about 0.5 to 15% based on the crude dimer aldehyde introduced into the distillation zone and is recycled to the dimer aldehyde synthesis zone.

3. In a carbonylation process wherein propylene is oxonated with carbon monoxide and hydrogen in the presence of a water-insoluble, oil-soluble cobalt carbonylation catalyst to produce a $C_4$ aldehyde and the resulting $C_4$ aldehyde is dimerized and dehydrated in a reaction zone in the presence of a water-insoluble oil-soluble zinc compound to produce a crude aldox mixture rich in $C_8$ aldehyde and containing cobalt and zinc compounds, the improvement which comprises introducing the said crude $C_8$ aldox mixture into a distillation zone, introducing steam into said mixture and maintaining it at a temperature between about 212° and 275° F. and under a pressure such that no liquid water phase exists in said distillation zone, withdrawing as a distillate from said distillation zone a demetallized mixture comprising $C_8$ aldehydes and steam, separating from said distillate an organic product rich in $C_8$ aldehyde, withdrawing from said distillation zone a bottoms fraction containing $C_8$ aldol and higher boiling oxygenated products as well as oil-soluble cobalt and zinc compounds, cooling the withdrawn bottoms fraction and recycling it to the said reaction zone.

4. In a carbonylation process wherein propylene is reacted with carbon monoxide and hydrogen in the presence of a water-insoluble oil-soluble cobalt carbonylation catalyst in a first stage under conditions to produce a mixture rich in butyraldehyde and the resulting reaction mixture is heat soaked in a second stage in the presence of a water-insoluble oil-soluble zinc catalyst added thereto to produce a crude product rich in $C_8$ aldehyde, the improvement which comprises introducing steam into said crude product in a distillation zone at a temperature between about 212° and 275° F. and under a pressure such that no liquid water exists in said distillation zone, withdrawing from said distillation zone an overhead stream containing demetallized $C_8$ aldehyde, withdrawing from said distillation zone a bottoms fraction amounting to about 1 to 5% based on said crude product and containing oil-soluble catalyst compounds dissolved therein, recycling the said bottoms fraction directly to said zinc-containing second stage, and adding fresh oil-soluble cobalt carbonylation catalyst to said first stage.

References Cited in the file of this patent

UNITED STATES PATENTS

| | | |
|---|---|---|
| 2,710,797 | Gwynn | June 14, 1955 |
| 2,747,986 | Gwynn et al. | May 29, 1956 |
| 2,779,796 | Munger | Jan. 29, 1957 |
| 2,820,067 | Mertzweiller et al. | Jan. 14, 1958 |